United States Patent
Hirdina

(10) Patent No.: US 11,590,684 B2
(45) Date of Patent: Feb. 28, 2023

(54) METHOD AND APPARATUS FOR PRODUCING PLASTIC PREFORMS AND PLASTIC CONTAINERS WITH THERMAL PREFORM STORAGE

(71) Applicant: KRONES AG, Neutraubling (DE)

(72) Inventor: Jochen Hirdina, Regensburg (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 17/405,450

(22) Filed: Aug. 18, 2021

(65) Prior Publication Data

US 2022/0063173 A1 Mar. 3, 2022

(30) Foreign Application Priority Data

Aug. 27, 2020 (DE) .................... 10 2020 122 471.0

(51) Int. Cl.
*B29C 49/48* (2006.01)
*B29C 49/64* (2006.01)
(Continued)

(52) U.S. Cl.
CPC .......... *B29C 49/6409* (2013.01); *B29C 49/06* (2013.01); *B29C 49/36* (2013.01);
(Continued)

(58) Field of Classification Search
CPC ............ B29C 49/4205; B29C 49/6409; B29C 49/6418; B29C 2049/024; B29C 49/06
See application file for complete search history.

(56) References Cited

U.S. PATENT DOCUMENTS 5,772,951 A * 6/1998 Coxhead ............. B29C 49/4205
264/537
8,506,869 B2 8/2013 Lappe et al.
(Continued)

FOREIGN PATENT DOCUMENTS

| DE | 10150780 | 4/2003 |
| DE | 102016103756 | 9/2017 |
| EP | 2392447 | 12/2011 |

OTHER PUBLICATIONS

Extended European Search Report dated Jan. 24, 2022 issued in corresponding European Application No. 21185514.3.

*Primary Examiner* — Robert B Davis
(74) *Attorney, Agent, or Firm* — Onello & Mello, LLP

(57) ABSTRACT

Method for operating an apparatus for producing plastic preforms and plastic containers, comprising at least one injection moulding machine and one blow moulding machine, wherein the plastic preforms are injection moulded within the injection moulding machine and are formed into plastic containers within the blow moulding machine and are transported from the injection moulding machine to the blow moulding machine, wherein a heating device is arranged downstream of the injection moulding machine and the injection moulding machine and the blow moulding machine are coupled to one another. According to the invention, the plastic preforms produced in the injection moulding machine are transferred directly after production to a thermal preform storage, which holds the plastic preforms at a predetermined temperature and wherein a speed and/or at least one parameter of at least one subsequent treatment device can be changed.

9 Claims, 2 Drawing Sheets

Figure 1:
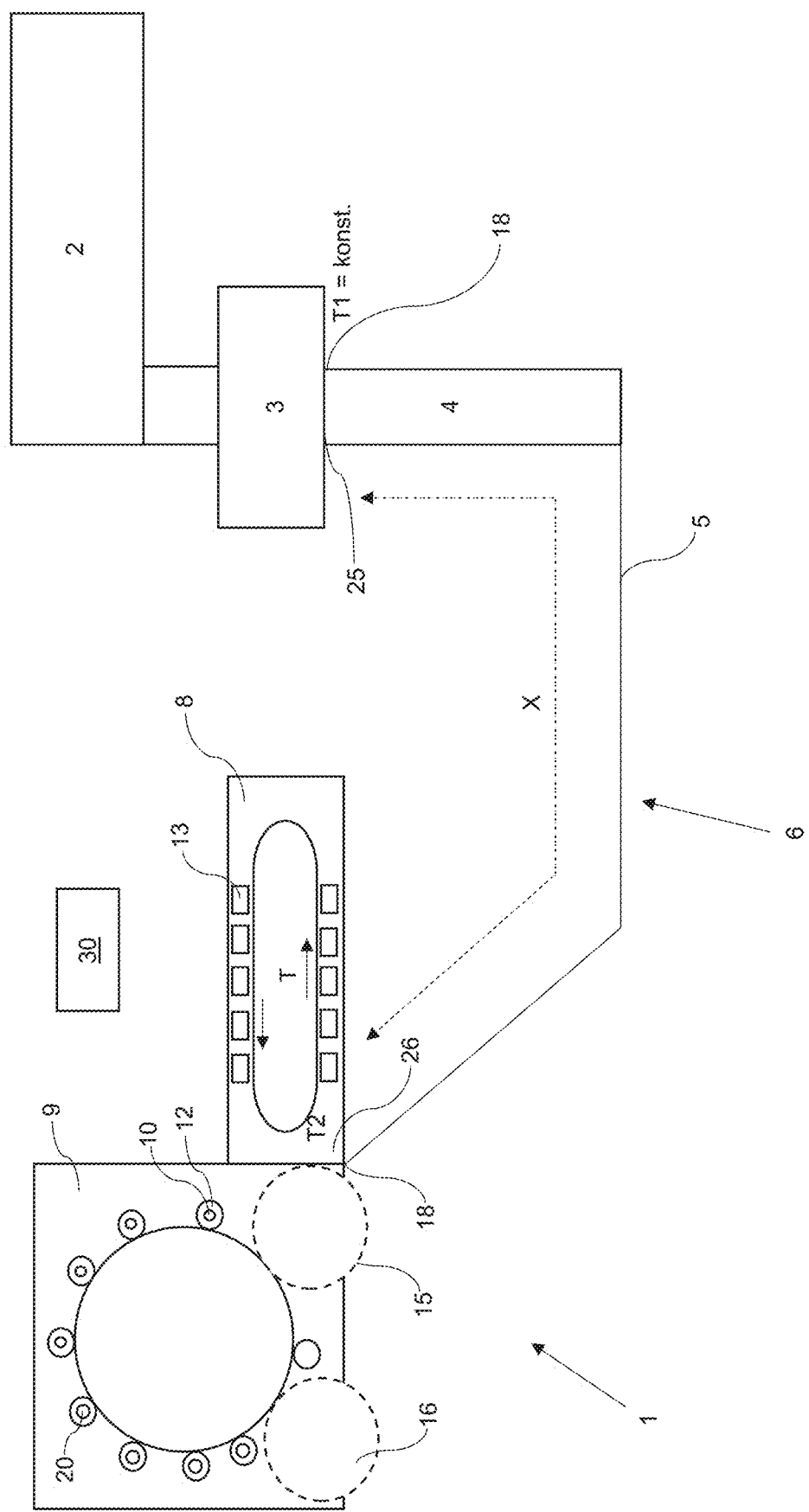

(51) Int. Cl.
*B29C 49/06* (2006.01)
*B29C 49/36* (2006.01)
*B29C 49/46* (2006.01)
B29K 105/00 (2006.01)
B29L 31/00 (2006.01)

(52) U.S. Cl.
CPC ...... *B29C 49/46* (2013.01); *B29C 2049/4638* (2013.01); *B29K 2105/253* (2013.01); *B29L 2031/712* (2013.01)

(56) References Cited

U.S. PATENT DOCUMENTS

| | | | |
|---|---|---|---|
| 9,403,311 B2* | 8/2016 | Forsthoevel | B29C 49/06 |
| 11,084,201 B2 | 8/2021 | Hirdina et al. | |
| 2011/0298145 A1 | 12/2011 | Lappe et al. | |
| 2013/0277892 A1* | 10/2013 | Hahn | B29C 49/4205 |
| | | | 425/526 |
| 2020/0290260 A1 | 9/2020 | Hirdina et al. | |

\* cited by examiner

METHOD AND APPARATUS FOR PRODUCING PLASTIC PREFORMS AND PLASTIC CONTAINERS WITH THERMAL PREFORM STORAGE

The present invention relates to a method of operating an apparatus for producing plastic preforms and plastic containers and to an apparatus for producing plastic preforms and plastic containers. Such apparatus and methods have been known in the prior art for a long time. It is known from the applicant's internal prior art that plastic preforms are first produced by means of an injection moulding process and are then temporarily stored in the form of bulk material until further processing. For further processing, the preforms are then fed as bulk material to a preform sorting device and fed in an orderly form to a heating device and a subsequent blow moulding machine, which moulds the plastic preforms into plastic containers.

The two-stage stretch blow moulding process described above is characterised by the fact that the preform production process and the stretch blow moulding or forming process are separated from each other. The disadvantage compared to a single-stage process, however, is the loss of the first heat, i.e. the residual heat content that is still present in the preform due to the melting of the PET during injection moulding (processing temperature during injection moulding approx. 280° C.; cooling temperature approx. 40 to 70° C.).

Usually, the preforms are processed at room temperature. However, due to the increasing forward integration of the value chain at customers with large output volumes, preform production is also increasingly being integrated directly into the filling operation. A direct coupling of the two processes injection moulding and blow moulding or stretch blow moulding without loss of the first heat would mean significant savings potential in energy consumption (approx. 30%) but also in machine investment (e.g. 30% shorter oven module).

The problem with such coupling approaches (integration of preform production into the filling operation) is, however, that due to the limited control process of the IR linear oven technology, a uniform preform input temperature into the oven of +/−1° C. must be ensured between successive preforms and a fluctuation over a longer period of time (daily fluctuations) of greater +/−5° C. can lead to a loss of the process window. Therefore, it is almost impossible to use the first heat (60° C.) of injection moulding, as even minor stops (<5 min), which can always occur on a filling line, cannot be compensated and the preform temperature drops too much and is outside the process limits.

If, for example, such a stop occurs, the preforms cool down over time on the non-tempered transport section between the injection moulding machine and the heating device located upstream of the blow moulding machine and it is not possible to ensure a uniform preform input temperature or the necessary preform energy content in the heating device. In the internal prior art of the applicant, it is then necessary to eject or recirculate these preforms.

The present invention is therefore based on the object of creating a method and an apparatus in which the above-mentioned disadvantages are avoided and, in particular, the plastic preforms, even after or during a stop in the production line, have a temperature at which they can be further processed without further heating.

According to the invention, this object is achieved by the subject matters of the independent claims. Advantageous embodiments and further developments are the subject matter of the subclaims.

The invention is therefore directed to a method of operating an apparatus for producing plastic preforms and plastic containers, comprising at least one injection moulding machine and a blow moulding machine, wherein the plastic preforms are injection moulded within the injection moulding machine and are formed into plastic containers within the blow moulding machine and are transported from the injection moulding machine to the blow moulding machine, and wherein downstream of the injection moulding machine a heating device is arranged which heats the plastic preforms to a temperature necessary for the blow moulding, wherein the injection moulding machine and the blow moulding machine are coupled to each other.

According to the invention, the plastic preforms produced in the injection moulding machine are transferred directly after production to a thermal preform storage which keeps the plastic preforms at a predetermined, in particular constant, temperature and wherein a speed and/or at least one parameter of at least one subsequent treatment device can be varied and this speed and/or this at least one parameter is adapted to an energy content of the plastic preform.

With the apparatus according to the invention, a thermal storage for preforms directly after injection moulding is therefore proposed to solve the above-mentioned problem, so that line stops of up to 10 min can be buffered without any problems without the energy in the preforms being lost, as they remain in the temperature-controlled storage for the duration of the stop. The injection moulding process, which is more stable than the filling line, can thus be started and stopped without any problems or, in the best case, not interrupted at all.

Compared to earlier approaches known from the internal state of the art of the applicant, such as reheating the preforms by means of a so-called hotbox, the solution now proposed no longer requires heating of the preforms, since they arrive in the storage unit with the first heat (temperature after injection moulding) and thus the dwell time in the corresponding buffer/storage unit can be arbitrary, since the energy content or the temperature of the preforms only needs to be maintained and should not be actively heated or cooled. The storage/buffer can therefore be completely filled or emptied without changing the temperature of the preforms at the outlet of the thermal preform storage. Only the internal temperature of the thermal preform storage, which corresponds to the inlet temperature of the preforms, must be kept constant. The energy consumption to maintain the temperature is relatively manageable with, for example, appropriate insulation and is in good proportion to the savings.

The coupling between the injection moulding machine and the blow moulding machine is understood to mean that they are arranged within an overall production plant or within a production block and thus have, for example, the same conveying speeds or the conveying speeds are coordinated with each other. In particular, the injection moulding machine and the blow moulding machine are thus spatially and production-technically connected to each other mechanically and control-technically and are not separated from each other. It is also conceivable to provide a complete system or a complete block, from the production of the plastic preforms in the injection moulding machine to the filled and labelled plastic containers.

Keeping the preforms in the thermal preform storage at a predefined and in particular or preferably constant temperature, which the preforms have after injection moulding, is understood to mean that the preforms are not actively heated within the thermal preform storage by means of, for example, heating devices or heating elements, but are merely kept at the temperature at which they are fed into the thermal preform storage. Preferably, an inlet temperature of the preforms into the thermal preform storage corresponds to an outlet temperature of the preforms from the thermal preform storage.

Direct transfer of the plastic preforms produced in the injection moulding machine to the thermal preform storage means that the preforms are fed to the thermal preform storage after production without further treatment and without intermediate storage. However, this does not exclude that transfer starwheels or the like are arranged between the injection moulding machine and the storage for transporting the preforms, such as discharge or transfer starwheels. It would also be conceivable to preferably arrange a belt conveyor between the injection moulding machine and the storage or to transport them via shuttles.

The subsequent treatment devices are preferably a heating device and/or a blow moulding machine or also another device required for plastic container production, such as a labelling device, a filling device or the like. The energy content of the preform is preferably a temperature of the preform. The parameter can be, for example, depending on the device, a temperature within the heating device, a time duration of the blow moulding or the like.

Accordingly, a speed and/or a parameter of the subsequent treatment device, preferably a speed and/or a parameter of the heating device and/or the blow moulding machine, is changed depending on the temperature of the preform. Preferably, the speed and/or the parameter is changed in order to compensate a malfunction in one or several of the subsequent treatment devices, in particular if one or more of the subsequent treatment devices must be stopped.

Preferably, the input temperature of the preforms into the thermal preform storage corresponds essentially to the temperature of the preforms after production in the injection moulding machine. Essentially means that the input temperature of the preforms into the thermal preform storage does not differ by more than +/−0-3° C. from the temperature of the preforms after production in the injection moulding machine, preferably by no more than +/−0-2° C., preferably by no more than +/−0-1° C. and particularly preferably by no more than +/−0-0.5° C.

The transport of the plastic preforms from the injection moulding machine to the blow moulding machine is preferably continuous, so that the plastic preforms can be fed to the blow moulding machine as quickly as possible. This is particularly advantageous with regard to the temperature of the preforms, as this decreases over time.

The heating device arranged downstream of the injection moulding machine preferably has a plurality of heating elements, such as infrared radiators or microwave generation devices, arranged along the transport path of the heating device, which heat the plastic preforms to a temperature necessary for blow moulding. The transport path of the heating device is preferably a circumferential transport path, which has curved and straight transport areas and particularly preferably has alternating curved and straight transport areas.

The blow moulding machine for forming the plastic preforms into plastic containers preferably has a plurality of blow moulding devices within which the plastic preforms are formed into the plastic containers by the acting upon with a liquid or gaseous medium and in particular compressed air. Advantageously, this plurality of blow moulding devices is arranged on a common movable carrier. This carrier is in particular a rotatable carrier.

Preferably, the blow moulding machine is a stretch blow moulding machine, so that the blow moulding devices or blowing stations each have stretching rods which stretch the plastic preforms in their longitudinal direction. Particularly preferably, the blow moulding machine is arranged within a clean room which delimits the blow moulding machine from a non-sterile environment.

To produce the plastic preforms in the injection moulding machine, an injection mould is preferably tempered and a liquid plastic granulate is injected into the mould. The mould and the granulate are then tempered so that the preform is formed. The finished preform is removed from the mould by opening the mould and preferably transferred to the thermal preform storage. Unlike in the prior art, the preform therefore advantageously does not lose its already existing heat through intermediate storage or the like.

Accordingly, in the invention described herein, the preforms are produced in a preferably clocked injection moulding machine and fed to a thermal preform storage. The thermal storage preferably serves to maintain the energy content or the temperature of the preforms. Advantageously, it is not necessary to heat up the preforms within the storage, as the preforms are already transferred to the storage at a warm temperature. The preforms leave the storage at a first temperature T1 (constant) and are fed to the heating device at a second temperature T2 (depending on the distance or time between the storage and the heating device). The retained energy content or temperature ($T1>T_{space}$) no longer has to be supplied when the preform is reheated in the heating device, so that the heating power or the heating time and thus the length of the heating device can be reduced accordingly.

Preferably, a preform sorting device and a preform feeder or the transport device for transporting the preforms from the injection moulding machine to the blow moulding machine are arranged between the thermal preform storage and the heating device. The preforms are thus preferably transferred from the thermal preform store to a preform sorting device and pass from the sorting device to the preform feeder, which feeds the preforms to the heating device.

In a preferred embodiment, the plastic preforms are blocked at the outlet of the thermal preform storage and/or at the inlet of the heating device for heating the plastic preforms. It is thus conceivable that in the event of a malfunction and a resulting stop, for example, in the blow moulding machine, the outlet of the preforms from the preform storage is blocked so that the preforms are temporarily stored inside the storage and kept at temperature. This means that in the event of a malfunction in the blow moulding machine, the production of the plastic preforms in the injection moulding machine can continue unhindered.

In the event of a stop, the preforms which are currently between the preform storage and the heating device on the preform feed cool down over time. In order to avoid a discharge or return of the preforms cooled down on the preform feed, it is preferably suggested to stop or block the feed from the thermal preform storage to the preform sorter and furthermore preferably to reduce the speed of the heating device and the blow moulding machine and/or to adjust a parameter of at least one subsequent treatment device according to the actual energy content, preferably the temperature, of the preforms. The remaining preforms still on the preform feed are advantageously transported through the heating device at a lower speed (adapted to the preferably reduced energy content of the preform) or are correspondingly tempered to a greater or lesser extent in the heating device and can thus be fed back to the blow moulding machine. Only when there are no more preforms on the transport section of the preform feed, the speed of the blow moulding machine and the heating device is increased again or the parameters of the blow moulding machine and the heating device are changed again and new preforms with the temperature T1 are fed to the preform sorter.

With the method according to the invention, it is therefore in particular also possible to use the first heat of the preforms (temperature after production in the injection moulding machine) and also to avoid ejecting/returning of preforms that have cooled down too much.

Preferably, the speed of the heating device and/or the blow moulding machine is controlled or changed and/or a parameter of the heating device and/or blow moulding machine is changed. Particularly preferably, this speed is in particular a transport speed of the preforms through the heating device and/or the blow moulding machine and the parameter is a temperature of the heating device and/or a time duration of the forming.

In a particularly preferred embodiment, the temperature inside the thermal preform storage is kept essentially constant. By essentially it is understood that the temperature in the interior of the preform storage does not deviate by more than +/−2.5° C. from the temperature that the preforms have after the manufacturing process inside the injection moulding machine, preferably by no more than +/−1.5° C., preferably by no more than +/−1° C. and particularly preferably by no more than +/−0.5° C.

The thermal preform storage is ideally similar or identical to a preform chute (with lid) known from the applicant's prior art and is only supplemented by a temperature control system. Advantageously, all known standard components such as steep conveyors and roller sorters (alternatively disc sorters) can be used to form the storage. Preferably, only the transport of the warm preforms from the preform storage to the blow moulding machine is still open or not tempered. Therefore, a fast transport system and/or a short transport distance is preferably used in order to keep the temperature drop of the preforms as low as possible during transport. In addition, with this procedure, the preforms are transported according to the FIFO principle, so that no fluctuations occur between the individual preforms and in particular their temperatures.

This requirement can preferably also be met by transporting the preforms by air, so that the preform production and the blow moulding do not have to be located directly next to each other. Preferably, the preforms are transported from the injection moulding machine to the blow moulding machine by means of an air transport system. In general, however, the distance between the preform storage and the blow moulding machine or between the preform storage and the heating device should be kept as short as possible in order to achieve maximum savings.

The temperature of the interior is preferably controlled by means selected from a group that includes heat exchangers, radiators, fan heaters, heating mats and the like. It is particularly advantageous to use media that are produced as a waste product during injection moulding anyway, such as hot water, hot air and the like.

As already described above, the energy saving potential by using the thermal preform storage for conventional preform heating can be seen at >30%. This can preferably be calculated by assuming a processing temperature of 95° C. during stretch blow moulding, an output temperature of the thermal storage of 50° C., a loss during transport of 2° C. and a room temperature of 18° C. as follows:

(95° C.−(50° C.−2° C.))/(95° C.−18° C.)=47° C./77° C.=0.61

1−0.61=39%

In a further preferred embodiment, the plastic preforms can remain inside the thermal preform storage indefinitely without the temperature of the plastic preforms increasing. This is preferably achieved by keeping the interior of the thermal preform storage at a constant temperature at least in sections and particularly preferably completely by the means mentioned above, but the preforms are preferably not actively heated in the storage.

In another advantageous embodiment, the temperature between successive plastic preforms is +/−1° C. when they enter the heating device. Particularly preferably, the temperature difference between successive plastic preforms is +/−0.5° C. Advantageously, the thermal preform accumulator is thus also suitable and intended for maintaining the temperature of successive plastic preforms at a substantially equal amount at least for a time. In this context, successive preforms are understood to be preforms that are transported next to each other and/or one behind the other within the transport device or as seen in the transport direction.

The present invention is further directed to an apparatus for producing plastic preforms and plastic containers, comprising at least one injection moulding machine for injection moulding the plastic preforms and a blow moulding machine for forming the plastic preforms into plastic containers, wherein the injection moulding machine and the blow moulding machine can be coupled to one another and with a transport device for transporting the plastic preforms from the injection moulding machine to the blow moulding machine, wherein the apparatus further comprises a heating device arranged downstream of the injection moulding machine, within which the plastic preforms can be heated to a temperature necessary for the blow moulding.

According to the invention, the plastic preforms produced in the injection moulding machine are transferred directly after production to a thermal preform store which keeps the plastic preforms at a predetermined, in particular constant, temperature, and wherein a sensor device is provided between the thermal preform store and a heating device for heating the plastic preforms, which sensor device measures a value of a preform which is characteristic of the energy content, wherein this value being transferred to a control device with which a speed and/or at least one parameter of at least one subsequent treatment device is controlled.

Accordingly, it is also proposed on the process side to provide a thermal storage for preforms directly after injection moulding, so that line stops of up to 10 min can be buffered without any problems and without the energy in the preforms being lost.

As mentioned above, this speed is a transport speed of the preforms. Preferably, the speed is controlled when there is a malfunction in one or several devices, such as the blow moulding machine, a labelling device or a filling device, or when one or several of these devices must be stopped.

In a preferred embodiment, a blocking device is provided at the outlet of the thermal preform storage and/or at the inlet of a heating device for heating the plastic preforms. The blocking device is preferably a barrier, a blocking finger or the like.

This means that the feed of preforms from the preform storage to a preform sorter downstream of the storage and to the preform feed can preferably be stopped. The blocking device is particularly preferably activated if, for example, a malfunction or stop occurs in the blow-moulding machine or in the filling device or labelling device downstream of the blow-moulding machine.

Preferably, this prevents the preforms from moving on to the preform feed and cooling down here, but instead they are kept at their temperature inside the storage. As soon as the malfunction has been remedied, the preforms are transported further and can be processed without any problems and without additional effort. The preforms, which were already on the preform feed at the time of activation of the blocking devices, are preferably heated again to the required temperature in the heating device with adapted energy content or for a longer time than usual after the malfunction has been rectified.

In another preferred embodiment, the thermal preform storage is arranged upstream of the injection moulding machine and downstream of the blow moulding machine. Particularly preferably, the thermal preform storage is arranged directly downstream of the injection moulding machine. However, this does not exclude that further devices such as transfer starwheels, conveyor belts, a transport via shuttles or the like are arranged between the injection moulding machine and the preform storage.

In another advantageous embodiment, the subsequent treatment unit is a heating device for heating the plastic preforms, a blow moulding machine for forming the plastic preforms into plastic containers, a labelling device for labelling the plastic containers, a filling device for filling the plastic containers or the like.

Further advantages and embodiments can be seen in the attached drawings.

Figure 2:
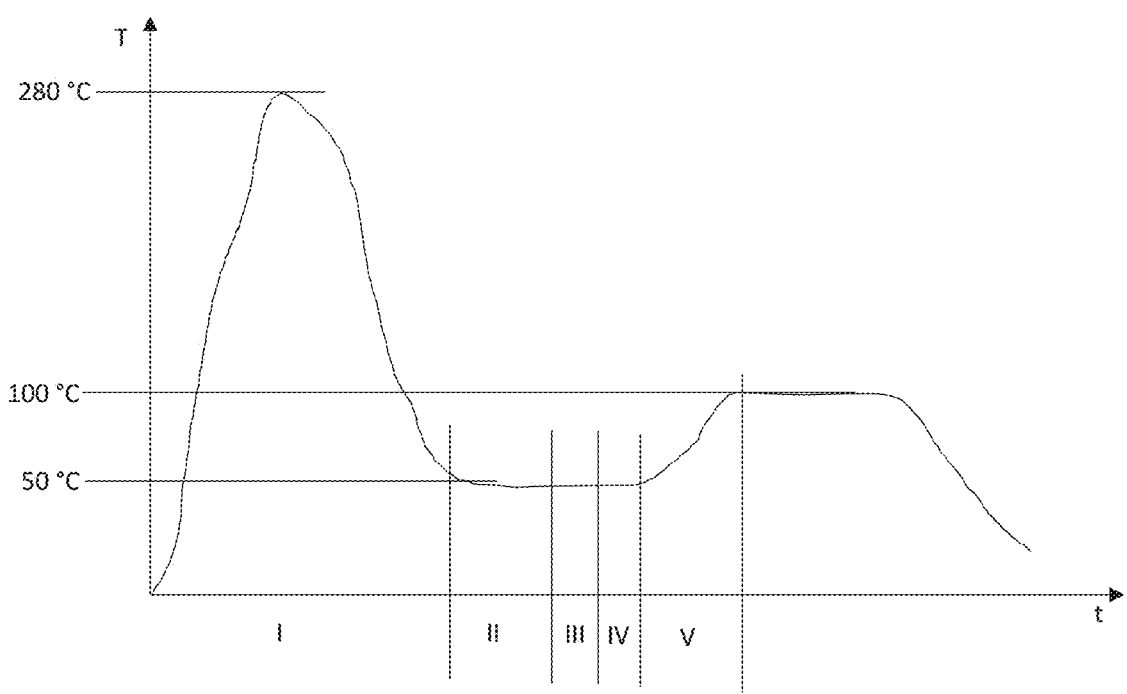

In it shows:

FIG. 1 a schematic representation of an embodiment according to the invention of an apparatus for producing plastic preforms and plastic containers with thermal preform storage; and FIG. 2 a graphical representation of the temperature curve of the plastic preforms.

FIG. 1 shows a schematic representation of an apparatus 1 according to the invention for producing plastic preforms 10 and plastic containers 20. The reference sign 2 refers to an injection moulding machine in which the plastic preforms 10 are produced. After production, the plastic preforms are transferred to the thermal preform storage 3 and kept here at a constant temperature T1, which corresponds to the temperature at which the plastic preforms leave the injection moulding machine 2.

The plastic preforms can preferably be prevented from being transported further at the outlet 25 of the thermal preform storage 3 by means of a blocking device 18 if, for example, a downstream machine has been stopped. Otherwise, the plastic preforms pass through the preform storage 3 in a predetermined time and then enter a sorting device 4, which sorts the preforms in a predetermined manner and, in particular, in an identical manner, before the plastic preforms are fed to the heating device 8 by means of a transport device 5 along the transport path X or the preform feed 6. A blocking device 18 can again be provided at the inlet 26 of the heating device 8.

During transport along the transport path X, the plastic preforms lose heat and cool down to the temperature T2. In order to keep this cooling or this loss of energy content of the preforms as low as possible, the transport device 5 or the preform feed 6 is preferably designed to be as short as possible. Ideally so short that there is no temperature loss. The preforms are thus fed to the heating device 8 at a temperature T2, wherein T2<T1, and heated here to a temperature necessary for blow moulding by means of a plurality of heating elements 13 arranged along the transport direction T. However, due to the thermal storage 3, this heating requires considerably less time and energy than without the arrangement of a thermal storage, in particular in the event of a malfunction or stop of a downstream machine, such as a labelling machine or a filling machine.

After heating in the heating device 8, the plastic preforms are fed to the blow moulding machine 9 via, for example, a (schematically shown) feed wheel 15, wherein the plastic preforms 10 are here formed into plastic containers 20 within blow moulds 12. The reference sign 30 schematically indicates a control device which can, for example, regulate or control a speed of the heating device 8 and the blow-moulding machine. The plastic containers 20 are discharged from the blow moulding machine 9 via a discharge wheel (shown schematically).

FIG. 2 shows a graphical representation of the temperature curve of the plastic preforms 10. Section I indicates the temperature curve during injection moulding. It can be seen that the temperature of the preforms can rise to approx. 280° C. during injection moulding and that the preforms leave the injection moulding machine at approx. 50° C. and enter the thermal storage at this temperature in section II and are kept at this temperature.

Sections III and IV identify the sorter and the preform transport, wherein the preforms ideally remain at the same temperature of approx. 50° C. here. Section V marks the heating and stretch blow moulding, wherein the plastic preforms are heated here to a temperature of approx. 100° C. and are formed into plastic containers or stretch blown at this temperature.

The applicant reserves the right to claim all features disclosed in the application documents as essential to the invention, provided they are individually or in combination new compared to the prior art. It is further pointed out that the individual figures also describe features which may be advantageous in themselves. The skilled person immediately recognises that a certain feature described in a figure can also be advantageous without adopting further features from this figure. Furthermore, the skilled person recognises that advantages can also result from a combination of several features shown in individual figures or in different figures.

LIST OF REFERENCE SIGNS 1 apparatus
2 injection moulding machine
3 thermal preform storage
4 sorting device
5 transport device
6 preform feed
8 heating device
9 blow moulding machine
10 plastic preforms
12 blow mould
13 heating elements
15 feed wheel
16 discharge wheel
18 blocking device
20 plastic containers
25 outlet of the thermal preform storage 3
26 inlet of the heating device 8

30 control device
T transport direction within the heating device 8
X Transport route
I injection moulding
II thermal storage
III sorter
IV preform transport
V heating-stretch blowing

The invention claimed is:

1. A method for operating an apparatus for producing plastic preforms and plastic containers, comprising at least one injection moulding machine and a blow moulding machine, wherein the plastic preforms are injection moulded within the injection moulding machine and are formed into plastic containers within the blow moulding machine and are transported from the injection moulding machine to the blow moulding machine, and wherein downstream of the injection moulding machine a heating device is arranged which heats the plastic preforms to a temperature necessary for the blow moulding, wherein the injection moulding machine and the blow moulding machine are coupled to one another, characterised in that the plastic preforms produced in the injection moulding machine are transferred directly after production to a thermal preform storage which keeps the plastic preforms at a predetermined constant temperature and wherein a speed and/or at least one parameter of at least one subsequent treatment device can be varied and this speed and/or this at least one parameter is adapted to an energy content of the plastic preform, wherein the preforms are not actively heated within the thermal preform storage by means, but are kept at the temperature at which they are fed into the thermal preform storage, so that an inlet temperature of the preforms into the thermal preform storage corresponds to an outlet temperature of the preforms from the thermal preform storage.

2. The method according to claim 1, characterised in that the plastic preforms are blocked at the outlet of the thermal preform storage and/or at the inlet of the heating device for heating the plastic preforms.

3. The method according to claim 1, characterised in that the temperature inside the thermal preform storage is kept substantially constant.

4. The method according to claim 1, characterised in that the plastic preforms can remain timely indefinitely within the thermal preform storage without the temperature of the plastic preforms increasing.

5. The method according to claim 1, characterised in that the temperature between successive plastic preforms when entering the heating device is +/−1° C.

6. An apparatus for producing plastic preforms and plastic containers, comprising at least one injection moulding machine for injection moulding the plastic preforms and a blow moulding machine for forming the plastic preforms into plastic containers, wherein the injection moulding machine and the blow moulding machine can be coupled to one another and with a transport device for transporting the plastic preforms from the injection moulding machine to the blow moulding machine, wherein the apparatus further comprises a heating device arranged downstream of the injection moulding machine, within which the plastic preforms can be heated to a temperature necessary for the blow moulding, characterised in that
the plastic preforms produced in the injection moulding machine are transferred directly after production to a thermal preform storage which keeps the plastic preforms at a predetermined constant temperature and wherein a sensor device is provided between the thermal preform storage and a heating device for heating the plastic preforms, which measures a value of a preform which is characteristic of the energy content, wherein this value being transferred to a control device with which a speed and/or at least one parameter of at least one subsequent treatment device is regulated, wherein the preforms are not actively heated within the thermal preform storage by means, but are kept at the temperature at which they are fed into the thermal preform storage, so that an inlet temperature of the preforms into the thermal preform storage corresponds to an outlet temperature of the preforms from the thermal preform storage.

7. The apparatus according to claim 6, characterised in that a blocking device is provided at the outlet of the thermal preform storage and/or at the inlet of the heating device.

8. The apparatus according to claim 6, characterized in that the thermal preform storage is arranged upstream of the injection moulding machine and downstream of the blow moulding machine.

9. The apparatus according to claim 6, characterised in that the subsequent treatment unit is a heating device for heating the plastic preforms, a blow-moulding machine for forming the plastic preforms into plastic containers, a labelling device for labelling the plastic containers, a filling device for filling the plastic containers or the like.

* * * * *